United States Patent
Garcia-Cruz

(12) 
(10) Patent No.: US 7,152,363 B1
(45) Date of Patent: Dec. 26, 2006

(54) ELECTRONIC CHUM DISPENSER

(76) Inventor: Carlos Garcia-Cruz, 4400 W. 16 Ave., Apt. 427, Hialeah, FL (US) 33012

(*) Notice: Subject to any disclaimer, the term of this patent is extended or adjusted under 35 U.S.C. 154(b) by 0 days.

(21) Appl. No.: 11/182,645

(22) Filed: Jul. 18, 2005

(51) Int. Cl.
*A01K 97/02* (2006.01)
(52) U.S. Cl. .................................... 43/44.99
(58) Field of Classification Search ............ 43/44.99, 43/57, 42.06; 119/51.04; 222/460
See application file for complete search history.

(56) References Cited

U.S. PATENT DOCUMENTS

| | | | |
|---|---|---|---|
| 2,709,317 A * | 5/1955 | Pease, Sr. ............ | 43/44.99 |
| 4,143,479 A | 3/1979 | Kingston ............. | 43/44.99 |
| 4,235,198 A | 11/1980 | Goguel ............... | 119/51 R |
| 5,054,230 A * | 10/1991 | Woodman ............. | 43/44.99 |
| 6,513,279 B1 | 2/2003 | Hernandez ........... | 43/44.99 |
| 2004/0046021 A1 | 3/2004 | Chung | |
| 2004/0195323 A1 | 10/2004 | Vadura et al. | |

* cited by examiner

*Primary Examiner*—Kurt Rowan
(74) *Attorney, Agent, or Firm*—Albert Bordas

(57) ABSTRACT

An electronic liquid chum dispenser, comprising a housing assembly, electronic means to dispense the liquid chum and first and second end-caps. The first end-cap is removably secured to the housing assembly to cover the first end and is weighted to weigh down the housing assembly. The second end-cap is removably secured to the housing assembly to form a watertight seal. The dispenser is used in a marine application for fishing to lure fish when liquid chumming an immediate area of water.

10 Claims, 5 Drawing Sheets

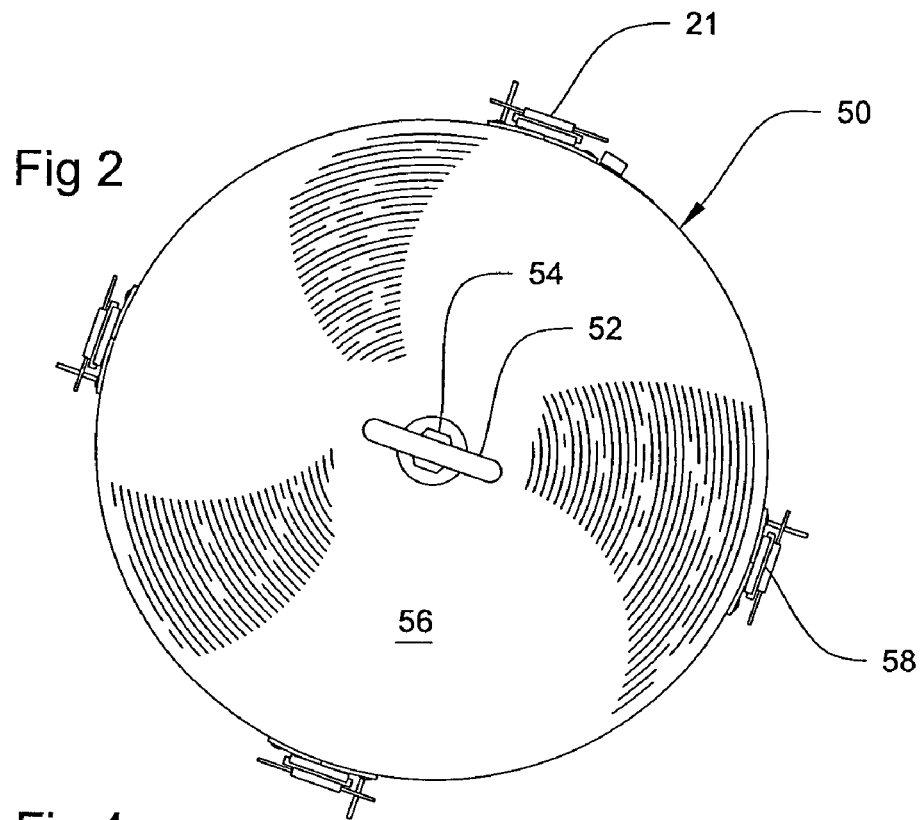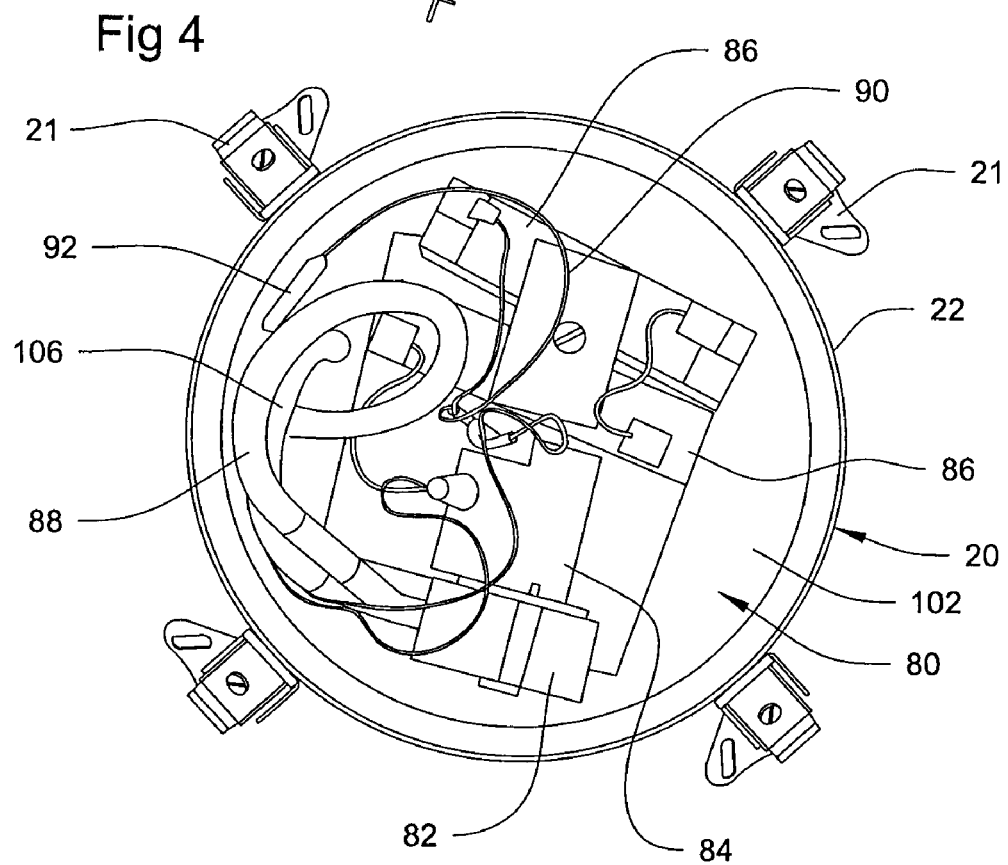

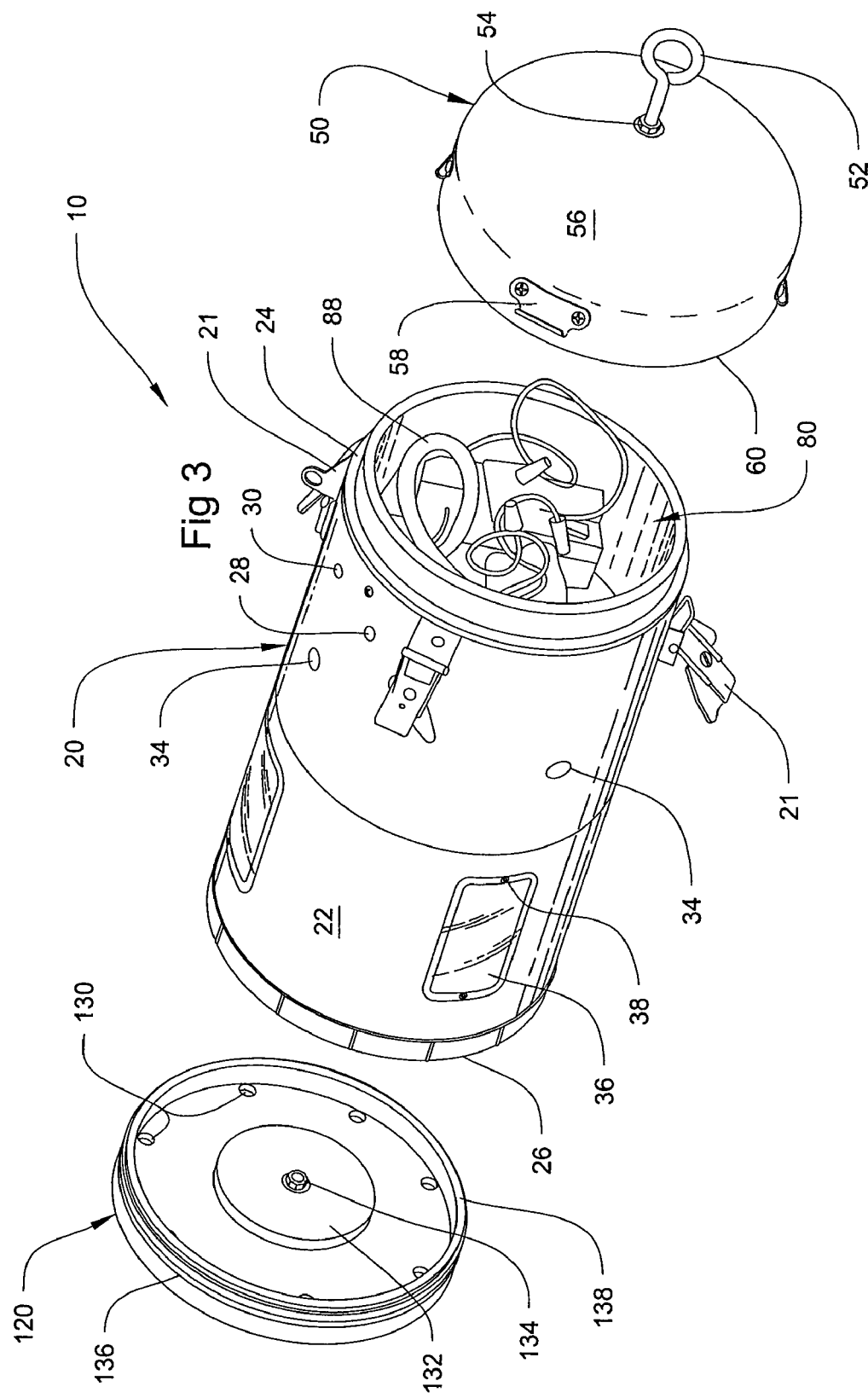

ELECTRONIC CHUM DISPENSER

BACKGROUND OF THE INVENTION

1. Field of the Invention

The present invention relates to an underwater dispenser, and more particularly, to a bait dispenser that houses liquid chum for fishing applications.

2. Description of the Related Art

Applicant believes that the closest reference corresponds to U.S. Pat. No. 4,235,198 issued to Goguel on Nov. 25, 1980 for Immersable device for a progressive distribution in particular for feeding fish. However, it differs from the present invention because Goguel teaches an envelope for containing the product to be distributed. A distribution orifice is provided in the envelope and a closing member, which is mounted to be movable relative to this orifice, is connected to a device for actuating the closing member. It is particularly advantageous in the use of the device in the feeding of fish.

Applicant believes another reference corresponds to U.S. Pat. No. 4,143,479 issued to Kingston on Mar. 13, 1979 for Fish bait dispenser. However, it differs from the present invention because Kingston teaches that a vacuum package containing a single dose of the material to be dispensed is held in a frame so that it can be cut open by a spring-loaded sliding blade. The blade is held off the package against the force of the spring by a timer, which is an arrangement of a metal shear pin in contact with another metal of lower electrode potential. Immersion of the timer in an electrolyte such as seawater initiates galvanic action, which causes the shear pin to corrode to failure close to a predetermined time.

Applicant believes another reference corresponds to U.S. Pat. No. 6,513,279 issued to Hernandez on Feb. 4, 2003 for Chum dispenser for fishing. However, it differs from the present invention because Hernandez teaches a chum dispenser that houses chum for fishing applications. The instant invention is suspended by a rope and is submerged under water to a predetermined depth. It comprises a housing with first and second ends. The housing stores chum and has through holes to allow chum to expel out. The first end has a removable weighted end-cap and the second end has a flap assembly. The rope suspends the instant invention by the flap assembly. Flaps cover the second end of the housing when the instant invention is weighted down by the weighted end-cap. The flap assembly has springs attached to the housing that keep it partially open, exposing the second end of the housing and allowing the chum to exit therefrom when the rope is jerked by the user to overcome the weight of the weighted end-cap.

Other patents describing the closest subject matter provide for a number of more or less complicated features that fail to solve the problem in an efficient and economical way. None of these patents suggest the novel features of the present invention.

SUMMARY OF THE INVENTION

A liquid bait and liquid chum dispenser. In the preferred embodiment, the instant invention is used in a marine application for fishing. The instant invention houses liquid chum, which is defined as bait usually consisting of oily fish ground up. With the instant invention, the user may prolong the use of liquid chum when fishing. A user may easily lure fish when liquid chumming an immediate area of water.

More specifically, the instant invention is an electronic liquid chum dispenser, comprising a housing assembly. The housing assembly has first and second ends and a dividing wall therebetween. A first cavity extends from the first end to the dividing wall. A second cavity extends from the dividing wall to the second end. The first cavity is substantially hollow to store liquid chum. The housing assembly also has a first at least one through hole for the liquid chum to expel out of. Electronic means make the liquid chum travel from the first cavity to the second cavity and through the first at least one through hole.

A first end-cap is removably secured to the housing assembly for covering the first end. The first end-cap is weighted to weigh down the housing assembly. A second end-cap is removably secured to the housing assembly to form a seal that is watertight. The electronic means comprises an electrical assembly that is accessible with removal of the second end-cap. The electrical assembly comprises a pump connected to a pump motor and is powered by at least one battery through an electrical conduit.

Extending from the first cavity is a first hose. The first hose extends through the dividing wall to the pump. The pump has a second hose that connects to the first at least one through hole. The liquid chum within the first cavity is housed within a bag. The housing assembly comprises a switch to operate the electrical assembly. The housing assembly comprises an LED that illuminates when the electrical assembly is operating. The housing assembly further comprises transparent windows to allow a user to see the bag. The second end comprises locks and the second end-cap comprises latches. The locks having cooperative characteristics to secure onto the latches to form the seal. The first end-cap has threads to screw into the first end of the housing assembly. The first end-cap comprises a second at least one through hole to allow water to enter the first cavity. The liquid chum is dispensed to attract water life such as fish.

It is therefore one of the main objects of the present invention to provide a liquid chum dispenser that prolongs the use of liquid chum when fishing.

It is another object of this invention to provide a liquid chum dispenser that enables a user to easily lure fish to an immediate fishing area.

It is another object of the present invention to provide a liquid chum dispenser that allows a user to control the amount of liquid chum to be dispensed.

It is yet another object of the present invention to provide a liquid chum dispenser that allows a user to control the frequency of liquid chum release to be utilized while fishing.

It is still another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 is a top view of the instant invention.

FIG. 3 is a perspective view of the instant invention with end-cap assemblies removed.

FIG. 4 is a view of the electrical assembly.

DETAILED DESCRIPTION OF THE PREFERRED EMBODIMENT

Figure 1:
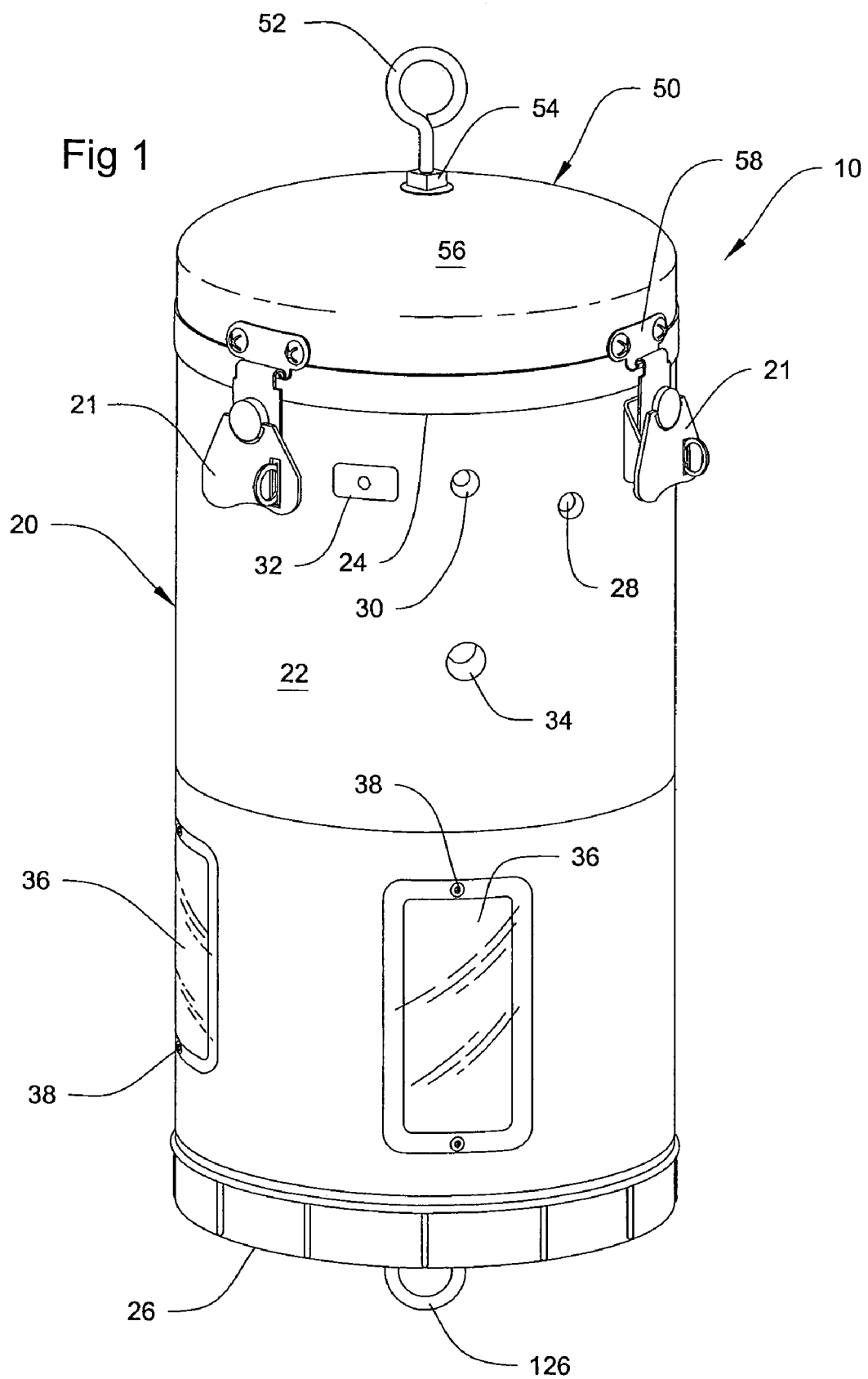
FIG. 1 represents a perspective view of the instant invention.

Referring now to the drawings, where the present invention is generally referred to with numeral 10, it can be observed that it basically includes housing assembly 20, end-cap assemblies 50 and 120, and electrical assembly 80.

As seen in FIGS. 1; 2; and 3, housing assembly 20 is generally cylindrically shaped in the preferred embodiment, having a top end defined by edge 24, and a bottom end defined by edge 26. Housing assembly 20 comprises housing 22. Housing 22 stores liquid chum C within, seen in FIG. 8. Through hole 30 on housing 22 is of a predetermined size to enable liquid chum C to expel out of housing assembly 20 when instant invention 10 is "on". Housing 22 also comprises switch 28. In the preferred embodiment, switch 28 is a push-button waterproof switch that is used to turn instant invention "on" and "off". While instant invention 10 is "on", liquid chum C expels out from through hole 30. LED 32 illuminates to indicate that electrical assembly 80, best seen in FIG. 4, is operating and instant invention 10 is dispensing liquid chum C. Housing 22 further comprises windows 36 affixed by screws 38. Windows 36 are transparent to allow a user to see bag 110 within cavity 100, best seen in FIG. 6.

End-cap assembly 50 removably latches onto housing 22. End-cap assembly 50 comprises end-cap 56 having latches 58. In the preferred embodiment, end-cap 56 has eye bolt 52 extending therefrom that may be secured by a nut 54. Locks 21, mounted onto housing 22, have cooperative characteristics to secure onto latches 58 wherein edge 60 meets edge 24 as best seen in FIG. 1. Once locks 21 are secured onto latches 58, a watertight seal is formed.

As best seen in FIG. 3, at the bottom end of housing assembly 20, is weighted end-cap assembly 120. In the preferred embodiment, weighted end-cap 120 has edge 138, and threads 136 to screw into housing 22. Housing 22 comprises through holes 34 to allow water to enter cavity 100 and end-cap 120 also comprises through holes 130 to allow water to enter cavity 100, seen in FIG. 5. End-cap 120 further comprises weight 132 that may be secured by nut 134.

Seen in FIG. 4 is a view of electrical assembly 80 that is accessible with the removal of end-cap assembly 50, seen in FIG. 2. Electrical assembly 80 comprises pump 82 connected to pump motor 84. Electrical assembly 80 is powered by batteries 86 providing current through electrical conduits 90 including LED plate 92 that is part of LED 32. Entering into the area defined by the electrical assembly 80 through plate 102 is intake hose 106. Intake hose 106 is connected to pump 82. Also connected to pump 82 is outtake hose 88. Outtake hose 88 has a distal end, not seen, that connects to through hole 30. Liquid chum C flows from bag 110, seen in FIGS. 5 and 6, through intake hose 106 to pump 82, and then it flows through outtake hose 88 and dispenses from though hole 30.

Figure 5:
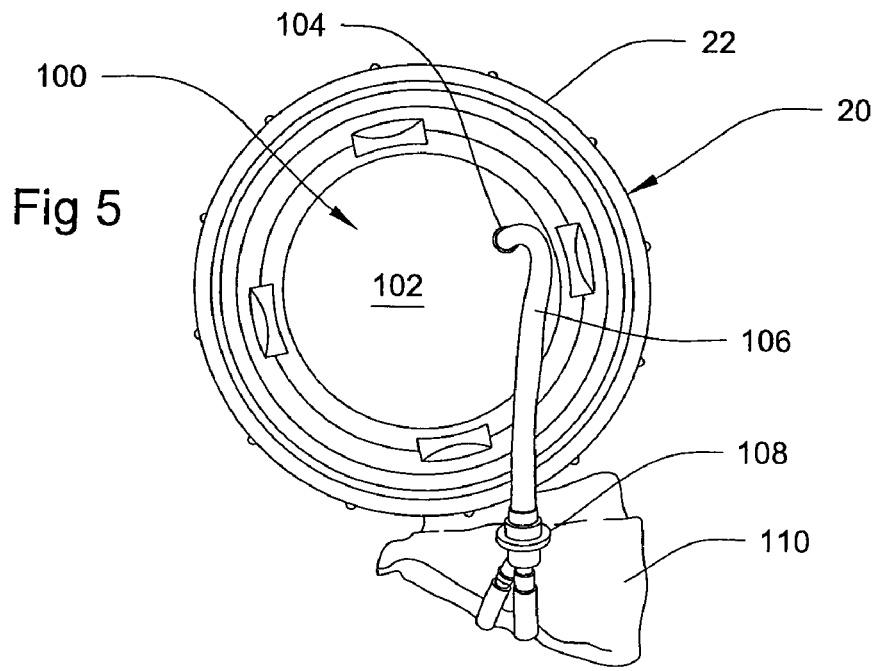
FIG. 5 illustrates a view of a liquid chum cavity.
Figure 6:
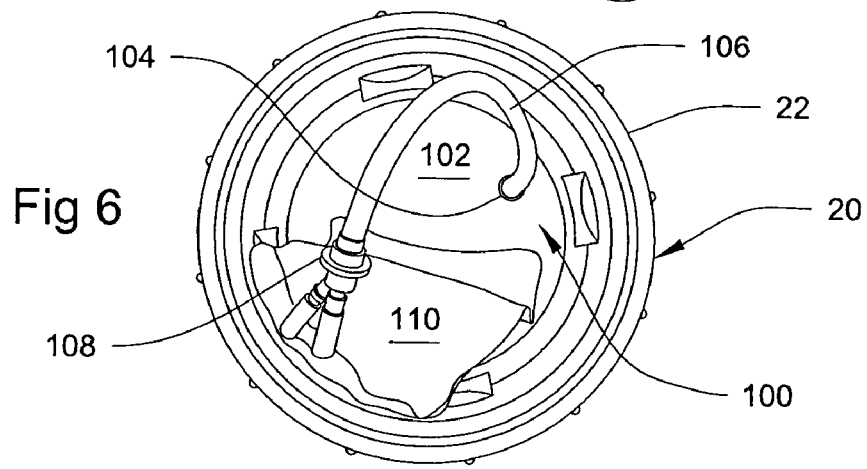
FIG. 6 illustrates a view of a liquid chum bag within the liquid chum cavity.

As seen in FIGS. 5 and 6, cavity 100 is of cooperative dimensions to allow room for bag 110. Fixedly secure to plate 102 is seal 104 that is a watertight seal. Intake hose 106 is secured onto bag 110 with connector 108.

Figure 7:
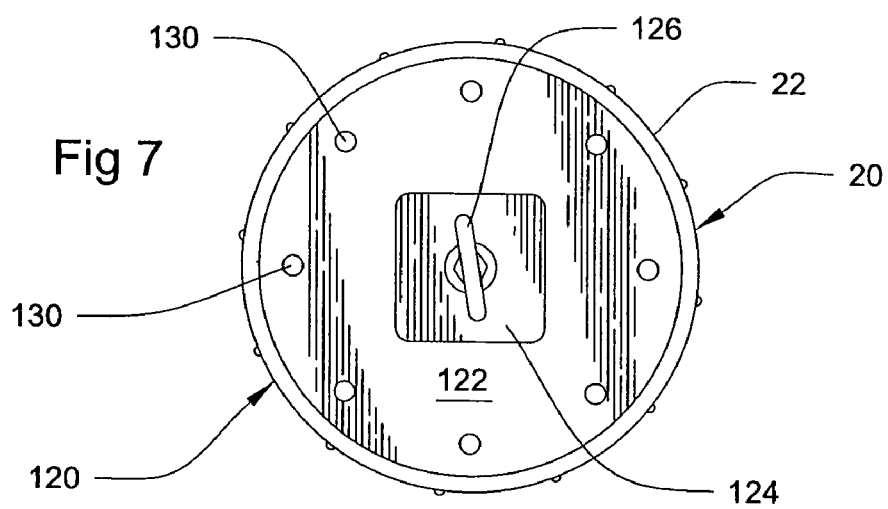
FIG. 7 is a bottom view of the instant invention.

As seen in FIG. 7, end-cap assembly 120 comprises end-cap 122 having through holes 130. Weight 124 may be secured thereon with eyebolt 126. It is noted that water W, seen in FIG. 8, enters though holes 130.

Instant invention 10 is made of a durable material that is also resistant to water, and especially salt water.

Figure 8:
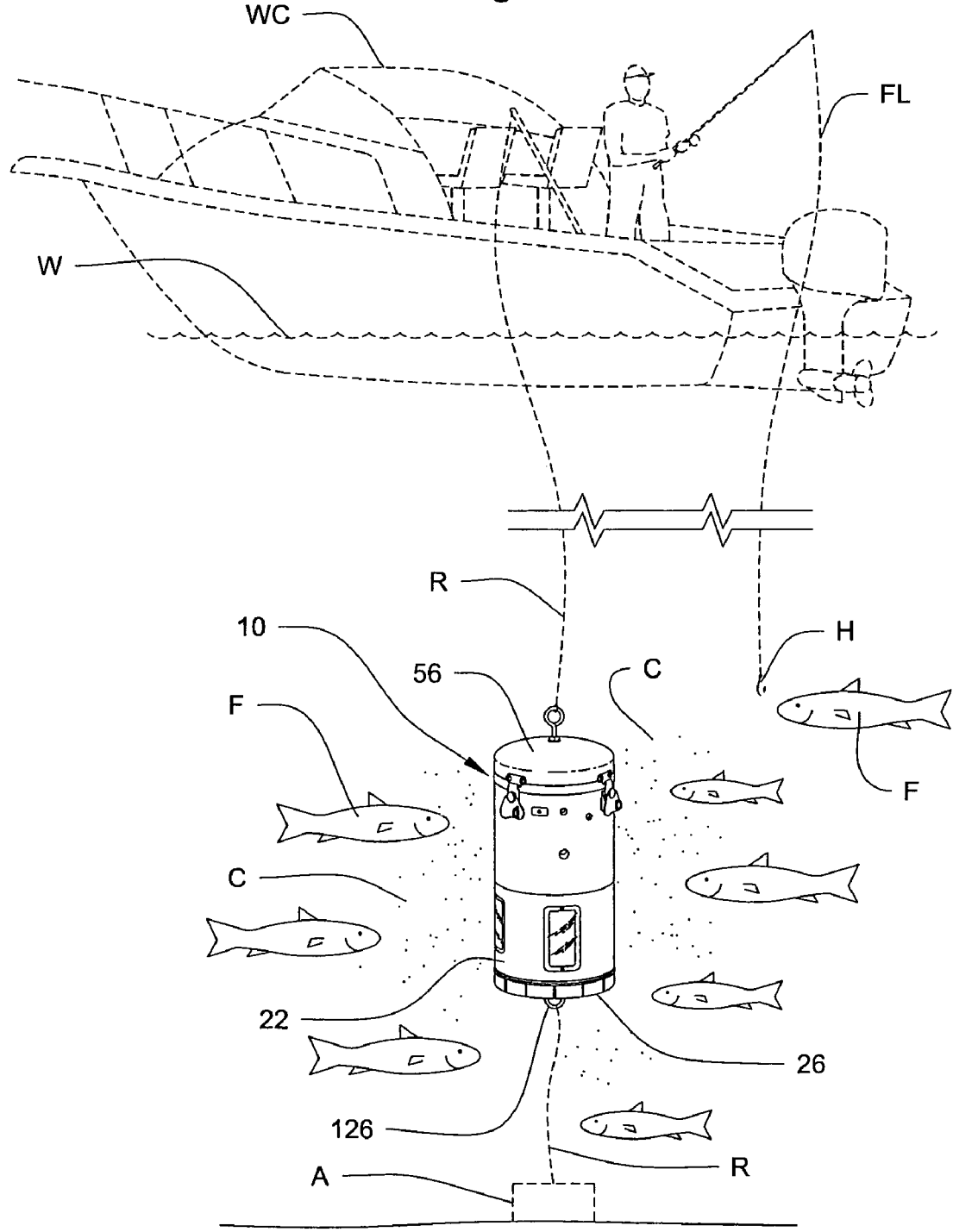
FIG. 8 is a perspective view of the instant invention suspended from a watercraft, with liquid chum escaping therefrom.

FIG. 8 illustrates instant invention 10 lowered to a predetermined depth of water W from watercraft WC. Instant invention 10 is suspended by rope R and is weighed down by weighted end-cap 120. From watercraft WC, a user may lower fishing line FL with its respective hook H to the vicinity of instant invention 10, in an effort to catch fish F that are lured to instant invention 10 with chum C. Optionally, instant invention 10 may comprise another rope R extending from eyebolt 126 and secured to an anchor A for stability if necessary.

Instant invention 10 need not be solely used from or with watercraft WC. Instant invention 10 may be suspended from a pier or any floating device where a person may fish. Such a floating device includes, but is not limited to, a barge, raft, or seaplane.

A user that is spear fishing may also use instant invention 10. Additionally, instant invention 10 may also be utilized to simply attract fish F. Such use of instant invention 10 may be for attracking fish F or enjoying fish watching as when scuba diving, snorkeling, or swimming.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electronic liquid chum dispenser, comprising:
    A) a housing assembly with first and second ends and a dividing wall therebetween defining a first cavity extending from said first end to said dividing wall, and defining a second cavity extending from said dividing wall to said second end, said first cavity being substantially hollow to store liquid chum, said housing assembly also having a first at least one through hole for said liquid chum to expel out of;
    B) electronic means for controlling said liquid chum from said first cavity to said second cavity and through said first at least one through hole;
    C) a first end-cap removably secured to said housing assembly for covering said first end, said first end-cap is weighted to weigh down said housing assembly; and
    D) a second end-cap removably secured to said housing assembly to seal said second end, said seal is watertight.

2. The electronic liquid chum dispenser according to claim 1, further characterized in that said electronic means comprises an electrical assembly that is accessible with removal of said second end-cap, said electrical assembly comprises a pump connected to a pump motor and is powered by at least one battery through an electrical conduit.

3. The electronic liquid chum dispenser according to claim 2, further characterized in that extending from said first cavity is a first hose, said first hose extending through said dividing wall to said pump, said pump having a second hose that connects to said first at least one through hole.

4. The electronic liquid chum dispenser according to claim 3, further characterized in that said liquid chum within said first cavity is housed within a bag.

5. The electronic liquid chum dispenser according to claim 4, further characterized in that said housing assembly comprises a switch to operate said electrical assembly.

6. The electronic liquid chum dispenser according to claim 5, further characterized in that said housing assembly comprises an LED that illuminates when said electrical assembly is operating.

7. The electronic liquid chum dispenser according to claim 6, further characterized in that said housing assembly comprises transparent windows to allow a user to see said bag.

8. The electronic liquid chum dispenser according to claim 7, further characterized in that said second end comprises locks and said second end-cap comprises latches, said locks having cooperative characteristics to secure onto said latches to form said seal.

9. The electronic liquid chum dispenser according to claim 8, further characterized in that said first end-cap has threads to screw into said first end of said housing assembly, and said first end-cap comprises second at least one through hole to allow water to enter said first cavity.

10. The electronic liquid chum dispenser according to claim 9, further characterized in that said liquid chum is dispensed to water life.

* * * * *